United States Patent
Tsujita et al.

(10) Patent No.: US 8,606,063 B2
(45) Date of Patent: Dec. 10, 2013

(54) MANUFACTURING METHOD FOR AN OPTICAL WAVEGUIDE AND OPTICAL WAVEGUIDE BODY USED THEREFOR

(75) Inventors: Yuichi Tsujita, Ibaraki (JP); Mayu Takase, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 195 days.

(21) Appl. No.: 13/337,407

(22) Filed: Dec. 27, 2011

(65) Prior Publication Data
US 2012/0195562 A1      Aug. 2, 2012

(30) Foreign Application Priority Data

Jan. 27, 2011   (JP) ................................ 2011-015636

(51) Int. Cl.
*G02B 6/036* (2006.01)
(52) U.S. Cl.
USPC ............... 385/126; 385/14; 385/52; 385/129; 427/163.2
(58) Field of Classification Search
USPC .................... 385/14, 52, 126, 129; 427/163.2; 430/321
See application file for complete search history.

(56) References Cited

U.S. PATENT DOCUMENTS

| 6,438,281 | B1 * | 8/2002 | Tsukamoto et al. ............ 385/14 |
| 2005/0018989 | A1 * | 1/2005 | Shimizu et al. ............... 385/129 |
| 2007/0058904 | A1 * | 3/2007 | Ban et al. ......................... 385/52 |
| 2008/0305439 | A1 * | 12/2008 | Khan ............................. 430/321 |
| 2009/0304324 | A1 * | 12/2009 | Kim et al. ........................ 385/14 |
| 2010/0074585 | A1 | 3/2010 | Shimizu et al. |
| 2010/0129026 | A1 * | 5/2010 | Hodono ........................... 385/14 |

FOREIGN PATENT DOCUMENTS

JP      2010-072435 A     4/2010

OTHER PUBLICATIONS

JPCA Standards, "Detail Specification for PMT Connector" Japan Electronics Packaging and Circuits Association, May 2006.

* cited by examiner

*Primary Examiner* — Ellen Kim
(74) *Attorney, Agent, or Firm* — Westerman, Hattori, Daniels & Adrian, LLP

(57) ABSTRACT

Provided is a manufacturing method for an optical waveguide in which, when the optical waveguide is cut and a contour thereof is processed, accuracy of a cut position is improved by improving visibility of an alignment mark. An undercladding layer, cores, and alignment marks are formed on a front surface of a substrate. Then, an overcladding layer is formed using a photomask so as to cover the cores with the alignment marks being exposed. After the substrate is separated to manufacture an optical waveguide body, a cut position is located with reference to the alignment marks from a rear surface side of the undercladding layer, and the undercladding layer and the overcladding layer are cut to manufacture the optical waveguide.

12 Claims, 2 Drawing Sheets

FIG. 4
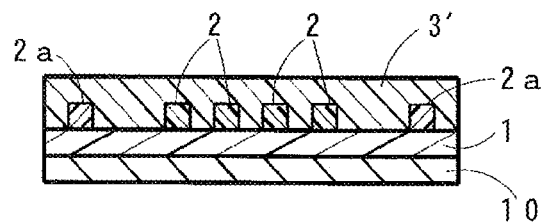
FIG. 5A
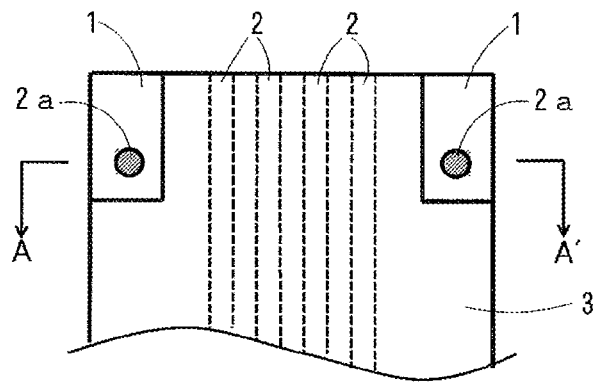
FIG. 5B
FIG. 6
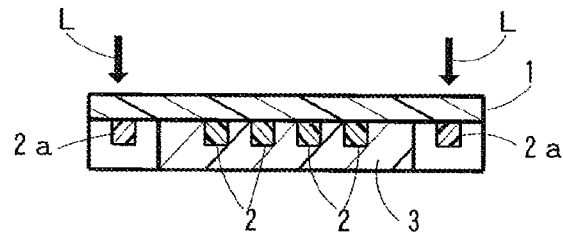

MANUFACTURING METHOD FOR AN OPTICAL WAVEGUIDE AND OPTICAL WAVEGUIDE BODY USED THEREFOR

BACKGROUND OF THE INVENTION

1. Field of the Invention

The present invention relates to a manufacturing method for an optical waveguide which is widely used in optical communication, optical information processing, position sensors, and other fields of general optics, and an optical waveguide body used therefor.

2. Description of the Related Art

In general, in signal transmission using optical wiring, an optical connector is used to couple optical fibers and/or optical waveguides. The optical connector includes a band-like optical waveguide, and a connection terminal having a predetermined shape called "ferrule", which is mounted to a longitudinal end portion of the optical waveguide and has guide holes into which guide pins for alignment may be inserted. As such a ferrule, in general, a PMT ferrule described in JPCA Standards "Detail Specification for PMT Connector" (JPCA-PE03-01-07-(2006)) is often used. In an optical connector using such an optical waveguide, the optical connector is inserted from one insertion opening of an optical waveguide fixing through hole of the PMT ferrule described the JPCA Standards "Detail Specification for PMT Connector" (JPCA-PE03-01-07-(2006)), and is fixed with one longitudinal end surface of the optical waveguide being exposed at the other opening of the through hole provided at a connection end surface of the ferrule having guide holes. The optical connector manufactured in this way is aligned and coupled by the above-mentioned guide pins and guide holes. Here, if the contour of the optical waveguide and a core in the optical waveguide are misaligned, efficient optical connection cannot be achieved at the coupled portion. That is, in order to achieve efficient optical connection, it is necessary to secure the positional accuracy between the contour of the optical waveguide and the core.

By the way, the optical waveguide used in the above-mentioned optical connector is ordinarily constructed by forming the core as an optical path in a predetermined pattern on a front surface of an undercladding layer and forming an overcladding layer so as to cover the core. In such an optical waveguide, all of the undercladding layer, the core, and the overcladding layer are formed using a polymer material. Such an optical waveguide formed of a polymer material is generally manufactured through patterning of the core by photolithography, a stamper, and photobleaching. When the patterning is carried out, a mark as a positional reference is sometimes formed together with the pattern of the core.

The optical waveguide manufactured in this way is, for example, formed into a film shape, and, after the above-mentioned overcladding layer is manufactured, appropriately cut into a contour having a predetermined size and a predetermined shape by dicing, a laser, or the like. Here, the cut position is determined with reference to the above-mentioned core or mark provided as a positional reference, and the cutting is carried out with reference thereto.

On the other hand, the mark as the reference of the cut position of the optical waveguide manufactured by the above-mentioned method is, together with the core, covered with the overcladding layer. The difference in refractive index between the mark and the overcladding layer is small, and thus, there is a problem that the mark has poor visibility. Further, an upper portion of the patterned mark is often rounded, and thus, a border between the mark and another portion may be indistinct. In particular, when the above-mentioned mark which is formed together with the core is visually recognized using an image analyzer or the like, the recognition is very difficult. Even if the recognition is possible, it is difficult to secure sufficient accuracy.

In order to secure visibility of the above-mentioned mark, for example, there is proposed a method in which a mark for setting a position as a reference of the cutting is formed and fixed so as to protrude on a cladding layer, that is, on a surface of a film-like optical waveguide main body, and the cut position is determined and the cutting is carried out with the mark for setting the position being the reference (see Japanese Patent Application Laid-open No. 2010-72435).

However, in the method described in Japanese Patent Application Laid-open No. 2010-72435, the mark for setting the position is formed and fixed on the surface of the optical waveguide main body, and thus, there is a problem that misalignment occurs when the mark is fixed. The misalignment accumulates as an error when the cutting is carried out, and thus, even if the visibility of the mark is improved, it is difficult to, as a result, secure positional accuracy for the cutting which is sufficiently satisfactory.

SUMMARY OF THE INVENTION

A manufacturing method for an optical waveguide and an optical waveguide body used therefor are provided in which, when an optical waveguide is cut and a contour thereof is processed, accuracy of a cut position is improved by improving visibility of an alignment mark.

According to a first aspect, there is provided a manufacturing method for an optical waveguide, including: forming an undercladding layer on a front surface of a substrate; patterning a core on a front surface of the undercladding layer; forming an alignment mark at a predetermined position on the undercladding layer; forming an overcladding layer so as to cover the core with the alignment mark being exposed; and locating a cut position with reference to the alignment mark from a rear surface side of the undercladding layer, and cutting the undercladding layer and the overcladding layer at a predetermined position.

Further, according to a second aspect, there is provided an optical waveguide body used for the above-mentioned manufacturing method for an optical waveguide, including: an undercladding layer; a core formed on the undercladding layer; an overcladding layer formed so as to cover the core; and an alignment mark formed on the undercladding layer so that a front surface thereof is exposed without being covered with the overcladding layer.

Specifically, after a core and an alignment mark were formed on an undercladding layer, an overcladding layer was formed so as to cover the core with the alignment mark being exposed, unlike a conventional case in which an alignment mark was, together with a core, formed within a cladding layer so as to be embedded therein. When the cut position is located with reference to the alignment mark from a rear surface side of the undercladding layer which is formed with the alignment mark being exposed in this way, the alignment mark is not covered with the overcladding layer but is exposed, and thus, the difference in refractive index between the alignment mark and the surroundings (air) becomes larger. Further, not a rounded portion of an upper portion of the alignment mark but a lower portion of the alignment mark at which the border is distinct is viewed. Therefore, the visibility is improved, and sufficient accuracy of the cut position may be secured. The above-mentioned undercladding layer and overcladding layer were able to be cut at a predetermined position with high accuracy.

As described above, a manufacturing method for an optical waveguide is provided by, after forming, on an undercladding layer, an overcladding layer so as to cover a core pattern with an alignment mark being exposed, locating a cut position from a rear surface side of the undercladding layer with reference to the alignment mark, and cutting the undercladding layer and the overcladding layer at a predetermined position. An optical waveguide body used for the manufacturing method for an optical waveguide is provided, including an undercladding layer, a core formed on the undercladding layer, an overcladding layer formed so as to cover the core, and an alignment mark formed on the undercladding layer so that a front surface thereof is exposed without being covered with the overcladding layer. Therefore, the visibility of the alignment mark is improved, and the positional accuracy when the cut position is located with reference to the alignment mark is significantly improved. This results in improvement of the production yield of the optical waveguide to obtain an optical waveguide which is excellent in productivity and reliability.

BRIEF DESCRIPTION OF THE DRAWINGS

In the accompanying drawings:

FIG. 4 is an explanatory view schematically illustrating the manufacturing method for an optical waveguide;

FIG. 5A is a plan view illustrating the structure of the optical waveguide obtained by the manufacturing method;

FIG. 5B is a sectional view taken along the arrow A-A' of FIG. 5A; and

FIG. 6 is an explanatory view schematically illustrating the manufacturing method for an optical waveguide.

DETAILED DESCRIPTION OF THE INVENTION

Next, an embodiment of the present invention is described in detail.

<Manufacturing Method for Optical Waveguide>

A manufacturing method for an optical waveguide is now described in detail.

First, a substrate 10 (see FIG. 1), to be used when an undercladding layer 1 is formed, is prepared. The forming material for the substrate 10 is, for example, a glass material, an Si wafer, various kinds of polymer materials such as polyethylene terephthalate (PET) and polyethylene naphthalate (PEN), or various kinds of metal materials such as SUS. Among those materials, a substrate made of glass and a substrate made of SUS are preferred from the viewpoint of being excellent in resistance to expansion and contraction due to heat and from the viewpoint of substantially maintaining various dimensions at designed values in the process of manufacturing the optical waveguide. Further, the thickness of the substrate 10 is appropriately set within a range of, for example, 20 μm (film shape) to 5 mm (plate shape).

(Formation of Undercladding Layer)

Figure 1:
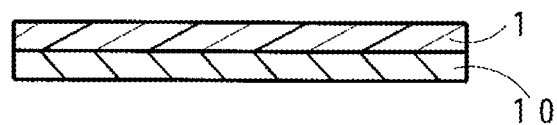
FIG. 1 is an explanatory view schematically illustrating a manufacturing method for an optical waveguide.

Then, as illustrated in FIG. 1, the undercladding layer 1 is formed on a front surface of the above-mentioned substrate 10. The forming material for the undercladding layer 1 is, for example, a thermosetting resin or a photosensitive resin. When the above-mentioned thermosetting resin is used, the thermosetting resin is formed on the undercladding layer 1 by heating the varnish after varnish in which the thermosetting resin is dissolved in a solvent is applied to the undercladding layer 1. On the other hand, when the above-mentioned photosensitive resin is used, the photosensitive resin is formed on the undercladding layer 1 by exposing the varnish to a radiation ray such as an ultraviolet ray after varnish in which the photosensitive resin is dissolved in a solvent is applied to the undercladding layer 1. The thickness of the undercladding layer 1 is set within a range of, for example, 5 to 50 μm, preferably 10 to 30 μm.

(Formation of Core and Formation of Alignment Mark)

Figure 2:
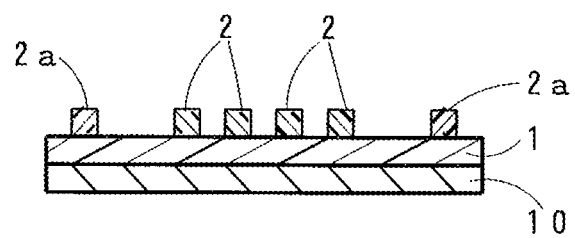
FIG. 2 is an explanatory view schematically illustrating the manufacturing method for an optical waveguide.

Next, as illustrated in FIG. 2, cores 2 in a predetermined pattern and alignment marks 2a are formed by photolithography on a front surface of the above-mentioned undercladding layer 1. The above-mentioned cores 2 and alignment marks 2a are formed by, for example, coating the front surface of the undercladding layer 1 with a core forming material (alignment mark forming material) and drying the material to form a film layer. Then, exposure is carried out via a predetermined photomask (for forming the core pattern and the alignment marks), and subsequently, heating treatment is carried out. Then, after a developer is used to develop and remove an unexposed portion, water wash and drying are carried out to form the pattern of the cores 2 and to form the alignment marks 2a. The width of the core 2 formed as described above is, for example, set within a range of 10 to 500 μm. The thickness (height) of the core 2 is set within a range of, for example, 20 to 100 μm, preferably 30 to 70 μm.

Formation of the cores 2 and the alignment marks 2a is described in detail. As described above, the undercladding layer 1 is coated with a photosensitive material which is the above-mentioned core forming material (alignment mark forming material) using a coater such as a spin coater or an applicator, and drying is carried out under predetermined conditions to form the film layer. After the film layer is formed, exposure is carried out by applying a radiation ray such as an ultraviolet ray via the photomask in a predetermined shape (for forming the cores and the alignment marks). Then, heating treatment is carried out to cure an exposed portion. Then, the developer (γ-butyrolactone solution or the like) is used to develop the unexposed portion, the portion is removed by water wash, and drying is carried out to form the pattern of the cores 2 in a predetermined shape and to form the alignment marks 2a. In this way, the alignment marks 2a are formed in the vicinity of both ends which are predetermined positions of the above-mentioned undercladding layer 1 together with the formation of the above-mentioned cores 2 (see FIG. 2).

Figure 3:
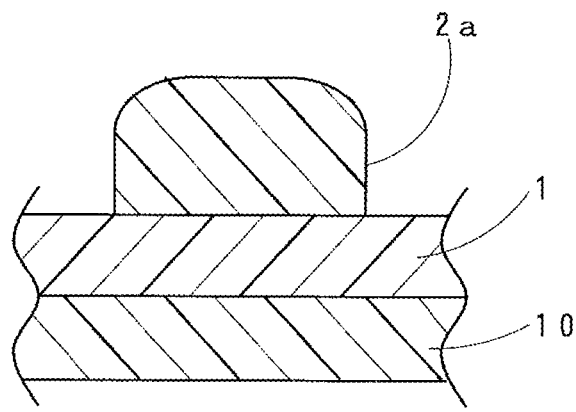
FIG. 3 is an enlarged side view schematically illustrating the shape of an alignment mark formed by the manufacturing method for an optical waveguide.

Here, the shape of the alignment marks 2a which are formed through the exposure and development only needs to be visually recognized as the alignment marks 2a by an alignment camera or the like. Specifically, as illustrated in FIG. 3, the alignment marks 2a may have a substantially cylindrical shape with the peripheral portion of the top surface being tapered so as to be rounded (have a curved surface), or may have a substantially prism-like shape or the like. With regard to the size of the above-mentioned alignment marks 2a, when the alignment marks 2a have, for example, a substantially cylindrical shape, the diameter is preferably 50 to 300 μm, more preferably 100 to 250 μm. When the alignment marks 2a have a substantially prism-like shape, the length of one side is preferably 50 to 300 μm, more preferably 100 to 250 μm.

(Formation of Overcladding Layer)

Next, as illustrated in FIG. 4, an overcladding layer forming material (varnish) is applied to the front surface of the above-mentioned undercladding layer 1 so as to cover the above-mentioned cores 2 and alignment marks 2a to form a photosensitive resin layer 3' for forming an overcladding layer. Then, after heating treatment is carried out, a photomask which is patterned so that a radiation ray is not applied to the alignment marks 2a is prepared, the photomask is provided on the above-mentioned photosensitive resin layer 3', and exposure is carried out by applying a radiation ray. Then, after arbitrary heating treatment for completing the cure, a developer (γ-butyrolactone or the like) is used to develop an unexposed portion, the portion is removed by water wash, and drying by heating is carried out to form an overcladding layer 3 with the alignment marks 2a being exposed as illustrated in FIGS. 5A and 5B. The thickness of the overcladding layer 3 is set within a range of, for example, 5 to 50 μm, preferably 10 to 30 μm.

Then, by separating the substrate 10 from the undercladding layer 1, there is manufactured an optical waveguide body in which the cores 2 in the predetermined pattern and the alignment marks 2a are formed on the undercladding layer 1, and further, the overcladding layer 3 is formed so as to be laminated on the undercladding layer 1 and so as to encapsulate the above-mentioned cores 2 with the above-mentioned alignment marks 2a being exposed.

(Cutting of Optical Waveguide Body)

Next, as illustrated in FIG. 6, light is applied from the undercladding layer 1 side of the above-mentioned optical waveguide body in a direction of arrows L, and an alignment camera (not shown) is used to visually recognize the alignment marks 2a through the undercladding layer 1 to confirm a cut position. As the light for the above-mentioned alignment camera, light in the visible radiation range having a wavelength of 400 to 700 nm is generally used. Means for the above-mentioned visual recognition is, for example, the human eye, or image processing using an optical sensor or a camera.

After the above-mentioned alignment marks 2a are visually recognized to confirm the cut position, the undercladding layer 1, the cores 2, and the overcladding layer 3 of the optical waveguide body are cut by a predetermined method according to the alignment marks 2a (for example, so that the cutting line passes through centers of the alignment marks 2a). In this way, the optical waveguide is manufactured. The above-mentioned cutting method is, for example, dicing using a dicing saw or a dicing blade, or cutting using a laser or the like. Note that if the material for the substrate 10 used in manufacturing the optical waveguide is transparent (for example, glass, polyethylene terephthalate (PET), or polyethylene naphthalate (PEN)), a method in which the optical waveguide is separated from the substrate 10 after the cutting step is also possible.

(Respective Forming Materials)

Both of the forming material for the above-mentioned cores 2 (same as the forming material for the alignment marks 2a) and the forming material for the cladding layers (forming material for the undercladding layer 1 and the forming material for the overcladding layer 3) may be a photosensitive resin (photopolymerized resin) such as an oxetane resin and a silicone resin as well as an epoxy resin, a polyimide resin, an acrylic resin, and a methacrylic resin. Among those resins, a cationic polymerized epoxy resin is preferred from the viewpoint of cost, the film thickness controllability, the loss, and the like. In particular, it is preferred that, as the cladding layer forming material, the above-mentioned solid epoxy resin be used. Further, it is preferred that, as the forming material for the cores 2, the above-mentioned o-cresol novolac glycidyl ether or the like be used.

The above-mentioned photopolymerized resin forms a photopolymerized resin composition, together with a photocatalyst such as a photoacid generator, a photobase generator, and a photoradical polymerization initiator, and may contain a reactive oligomer, a diluent, a coupling agent, and the like as other components.

As the above-mentioned photoacid generator, a compound such as an onium salt or a metallocene complex may be used. Examples of the onium salt which may be used include a diazonium salt, a sulfonium salt, an iodonium salt, a phosphonium salt, and a selenium salt. As counter ions in those salts, anions such as $CF_3SO_3^-$, $BF_4^-$, $PF_6^-$, $AsF_6^-$, and $SbF_6^-$ may be used. Specific examples of the salts include triphenylsulfonium triflate, 4-chlorobenzenediazonium hexafluorophosphate, triphenylsulfonium hexafluoroantimonate, triphenylsulfonium hexafluorophosphate, (4-phenylthiophenyl)diphenylsulfonium hexafluoroantimonate, (4-phenylthiophenyl)diphenylsulfonium hexafluorophosphate, bis[4-(diphenylsulfonio)phenyl]sulfide-bis-hexafluoroantimonate, bis[4-(diphenylsulfonio)phenyl]sulfide-bis-hexafluorophosphate, (4-methoxyphenyl)diphenylsulfonium hexafluoroantimonate, (4-methoxyphenyl)phenyliodonium hexafluoroantimonate, bis(4-t-butylphenyl)iodonium hexafluorophosphate, benzyltriphenylphosphonium hexafluoroantimonate, and triphenylseleniumhexafluorophosphate. Those compounds may be used alone or in combination of two or more kinds thereof.

Examples of the above-mentioned reactive oligomer which may be used include a fluorene derivative-type epoxy and many other kinds of epoxies, epoxy (meth)acrylates, urethane acrylates, butadiene acrylates, and oxetanes in particular, oxetanes are preferred because the effect of promoting curing of a polymerizable mixture is achieved by adding only a small amount thereof. Examples of the oxetanes include 3-ethyl-3-hydroxymethyl oxetane, 3-ethyl-3-(phenoxymethyl)oxetane, di(1-ethyl(3-oxetanyl))methyl ether, and 3-ethyl-3-(2-ethylhexyloxymethyl)oxetane. Those reactive oligomers may be used alone or in combination of two or more kinds thereof.

Examples of the above-mentioned diluent include alkyl monoglycidyl ethers having 2 to 25 carbon atoms such as butyl glycidyl ether and 2-ethylhexyl glycidyl ether, butanediol diglycidyl ether, 1,6-hexanediol diglycidyl ether, neopentyl glycol diglycidyl ether, dodecanediol diglycidyl ether, pentaerythritol polyglycidyl ether, trimethylolpropane polyglycidyl ether, glycerol polyglycidyl ether, phenyl glycidyl ether, resorcin glycidyl ether, p-tert-butylphenyl glycidyl ether, allyl glycidyl ether, tetrafluoropropyl glycidyl ether, octafluoropropyl glycidyl ether, dodecafluoropentyl glycidyl ether, styrene oxide, 1,7-octadiene diepoxide, limonene diepoxide, limonene monoxide, α-pinene epoxide, β-pinene epoxide, cyclohexene epoxide, cyclooctene epoxide, and vinylcyclohexene oxide.

Further, from the viewpoint of heat resistance and transparency, preferred examples of the diluent include epoxies each having an alicyclic structure in the molecule such as 3,4-epoxycyclohexenylmethyl-3',4'-epoxycyclohexene carboxylate, 3,4-epoxycyclohexenylethyl-8,4-epoxycyclohexene carboxylate, vinylcyclohexene dioxide, allylcyclohexene dioxide, 8,4-epoxy-4-methylcyclohexyl-2-propylene oxide, and bis(3,4-epoxycyclohexyl)ether. By mixing an appropriate amount of the diluent with the epoxy resin which is the base agent, the reaction rate of the epoxy group is increased, and as a result, the heat resistance of the resultant cured product and the flexibility when used as a film can be improved.

As the above-mentioned coupling agent, an epoxy-based coupling agent may be used. Examples thereof include 2-(3, 4-epoxycyclohexyl)ethyltrimethoxysilane, 3-glycidoxypropyltrimethoxysilane, 3-glycidoxypropylmethyldiethoxysilane, and 3-glycidoxypropyltriethoxysilane. Further, amino-based coupling agents such as 3-aminopropyltrimethoxysilane and 3-aminopropyltriethoxysilane may also be used.

<Use of Optical Waveguide>

The above-mentioned optical waveguide may be used as, for example, a signal line of optical wiring between boards or on a board in an electronic device. Specifically, an optical waveguide which is processed to have a predetermined size and a predetermined shape by the manufacturing method for an optical waveguide is inserted into a ferrule having an alignment function which is typified by the above-mentioned PMT ferrule to form an optical connector. The optical connector may be used as means for connection with a connector using an optical fiber which is fittable therewith, or means for connecting connectors each using an optical waveguide.

EXAMPLES

Next, examples are described together with comparative examples. Note that, the present invention is not limited to the examples.

First, the cladding layer (undercladding layer and overcladding layer) forming material and the core/alignment mark forming material were prepared.

(Preparation of Cladding Layer Forming Material (Varnish))

Component A (solid epoxy resin): epoxy resin including an aromatic ring skeleton (manufactured by Mitsubishi Chemical Corporation, EPIKOTE 1002) 70 parts by weight Component B (solid epoxy resin): epoxy resin including an alicyclic skeleton (manufactured by Daicel Chemical Industries Ltd., EHPE 3150) 30 parts by weight Component C (photoacid generator): 50% solution of triarylsulfonium salt in propylene carbonate (manufactured by San-Apro Ltd., CPI-200K) 2 parts by weight The above-mentioned Components A to C were dissolved in 55 parts by weight of ethyl lactate (produced by Musashino Chemical Laboratory, Ltd.) through agitation (temperature at 80° C. and agitation of 250 rpm for 3 hours) to prepare the undercladding layer and overcladding layer forming material (photosensitive resin composition). The viscosity of the photosensitive resin composition was measured using a digital viscometer (HBDV-1+CP manufactured by Brookfield Engineering Laboratories). The viscosity was 1,320 mPa·s.

(Preparation of Core/Alignment Mark Forming Material (Varnish))

Component D: o-cresol novolac glycidyl ether (manufactured by Nippon Steel Chemical Co., Ltd., YDCN-700-10) 100 parts by weight Component E (photoacid generator): 50% solution of triarylsulfonium salt in propylene carbonate (manufactured by San-Apro Ltd., CPI-200K) 1 part by weight The above-mentioned Components D and E were dissolved in 60 parts by weight of ethyl lactate (produced by Musashino Chemical Laboratory, Ltd.) through agitation (temperature at 80° C. and agitation of 250 rpm for 3 hours) to prepare the core/alignment mark forming material (photosensitive resin composition). The viscosity of the photosensitive resin composition was measured using the same digital viscometer as described above. The viscosity was 1,900 mPa·s.

Example 1

Formation of Undercladding Layer

The above-mentioned undercladding layer forming material (varnish) was applied to a front surface of a substrate formed of glass (manufactured by Central Glass Co., Ltd., 140 mm×140 mm×thickness 1.1 mm) using a spin coater (1X-DX2 manufactured by MIKASA CO., LTD.). After that, drying treatment at 130° C. for 10 minutes was carried out in a drying oven to form an applied layer (undercladding layer before being cured). Then, an exposure machine (MA-60A manufactured by MIKASA CO., LTD.) and an ultra high pressure mercury-vapor lamp (USH-250D manufactured by USHIO INC.) were used to apply an ultraviolet ray (having a wavelength of 365 nm) to the entire front surface of the undercladding layer before being cured to carry out exposure so that the accumulated light quantity was 2,000 mJ/cm$^2$. Then, heating treatment at 130° C. for 10 minutes was carried out to manufacture the undercladding layer (having a thickness of 25 µm) (see FIG. 1).

(Formation of Core and Alignment Mark)

Next, after the core/alignment mark forming material was applied to the front surface of the above-mentioned undercladding layer using the above-mentioned spin coater, drying treatment at 130° C. for 10 minutes was carried out in a drying oven to form an applied layer (layer before being cured). Then, exposure was carried out by applying an ultraviolet ray (having a wavelength of 365 nm) via the photomask for forming the predetermined core pattern and alignment marks using the above-mentioned exposure machine and the above-mentioned ultra high pressure mercury-vapor lamp so that the accumulated light quantity was 4,000 mJ/cm$^2$. Then, after heating treatment at 130° C. for 10 minutes was carried out, development was carried out by dipping into a developer of γ-butyrolactone (produced by Mitsubishi Chemical Corporation) (dipping development) for three minutes to dissolve and remove the unexposed portion. After that, drying treatment by heating at 120° C. for 10 minutes was carried out to form, on the undercladding layer, the linear core pattern for propagation of light and the alignment marks for locating the cut position (see FIG. 2).

The obtained core pattern had a height of 50 µm and a width of 50 µm. It was confirmed that the alignment marks had a substantially cylindrical shape with the peripheral portion of the top surface thereof being tapered. The alignment marks had a diameter of 200 µm and a height of 50 µm (see FIG. 3).

(Formation of Overcladding Layer)

Then, after the above-mentioned overcladding layer forming material was applied to the front surface of the above-mentioned undercladding layer using the above-mentioned spin coater so as to cover the above-mentioned core pattern and alignment marks, drying treatment at 70° C. for 10 minutes was carried out in a drying oven to form an applied layer (layer before being cured) (see FIG. 4). Then, a photomask which was patterned so that an ultraviolet ray was not applied to the above-mentioned alignment marks was prepared, and exposure was carried out by applying an ultraviolet ray (having a wavelength of 365 nm) via the photomask using the above-mentioned exposure machine and the above-mentioned ultra high pressure mercury-vapor lamp so that the accumulated light quantity was 2,000 mJ/cm$^2$. Then, after heating treatment at 130° C. for 10 minutes was carried out, development was carried out by dipping into a developer of γ-butyrolactone (produced by Mitsubishi Chemical Corporation) (dipping development) for three minutes to dissolve and remove the unexposed portion. After that, drying treatment by heating at 130° C. for 10 minutes was carried out to form, on the undercladding layer, the overcladding layer (having a maximum thickness of 25 μm) so as to cover the cores with the alignment marks being exposed (see FIGS. 5A and 5B).

(Cutting Step)

After that, by separating the substrate formed of glass from the undercladding layer, the optical waveguide body (having an overall thickness of 100 μm), in which the cores in the predetermined pattern and the alignment marks for locating the cut position were formed on the undercladding layer, and in which the overcladding layer was formed on the above-mentioned cores with the above-mentioned alignment marks being exposed, was manufactured. The optical waveguide body was adhered to a dicing tape (UE-111AJ manufactured by NITTO DENKO CORPORATION) so that the overcladding layer was in contact with an adhesive surface of the tape, and was set in a dicing saw (DAD322 manufactured by DISCO Corporation). After application of light from the undercladding layer side and visually recognizing the alignment marks using an alignment camera to confirm the cut position in automatic alignment (see FIG. 6), a dicing blade (ZH05-SD2000-N-1-70 BB manufactured by DISCO Corporation) was used to cut the optical waveguide body at a cutting speed of 1.0 mm/sec so that the cutting line passed through centers of the alignment marks for locating, to thereby manufacture the optical waveguide.

With regard to the dimension of the contour of the optical waveguide obtained by the cutting, a dimension measuring microscope (STM5-LM manufactured by Olympus Corporation) was used to measure the width of the cut optical waveguide film. The measurement was carried out with regard to 10 samples, and a standard deviation σ of the film width was 5.9 μm.

Comparative Example 1

An optical waveguide body manufactured similarly to the above-mentioned case of Example 1 was prepared, and the optical waveguide body was adhered to the above-mentioned dicing tape so that the undercladding layer of the optical waveguide body was in contact with the adhesive surface of the tape. After application of light from the overcladding layer side and visually recognizing the alignment marks using an alignment camera to confirm the cut position in automatic alignment, the above-mentioned dicing saw and the above-mentioned dicing blade were used to cut the optical waveguide body at a cutting speed of 1.0 mm/sec so that the cutting line passed through centers of the alignment marks for locating, to thereby manufacture the optical waveguide.

With regard to the dimension of the contour of the optical waveguide obtained by the cutting, a dimension measuring microscope (STM5-LM manufactured by Olympus Corporation) was used to measure the width of the cut optical waveguide film. The measurement was carried out with regard to 10 samples, and the standard deviation σ of the film width was 10.0 μm. From the result, it can be said that the above-mentioned value (standard deviation σ) of the dimension of the contour results from the poorer visibility of the alignment marks in Comparative Example 1 compared with that in Example 1.

Comparative Example 2

In the step of forming the overcladding layer in Example 1, the photomask was not used, and the overcladding layer was formed on the entire front surface of the undercladding layer so as to cover all the cores and alignment marks. The optical waveguide body was manufactured otherwise in the same way as in the case of Example 1. An attempt to confirm the cut position of the optical waveguide body obtained in this way was made by application of light from the overcladding layer side and visual recognition of the alignment marks using an alignment camera. However, it was difficult to visually recognize the above-mentioned alignment marks, and thus, the optical waveguide body were unable to be cut accurately so that the cutting line passed through centers of the alignment marks.

The manufacturing method for an optical waveguide may be used for, for example, manufacturing an optical waveguide which forms an optical connector used to couple optical fibers and/or optical waveguides.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. A manufacturing method for an optical waveguide, comprising:
    forming an undercladding layer on a front surface of a substrate;
    patterning a core on a front surface of the undercladding layer;
    forming an alignment mark at a predetermined position on the undercladding layer;
    forming an overcladding layer so as to cover the core with the alignment mark being exposed; and
    locating a cut position with reference to the alignment mark from a rear surface side of the undercladding layer, and cutting the undercladding layer and the overcladding layer at the predetermined position.

2. The manufacturing method for an optical waveguide according to claim 1, wherein the locating of the cut position is carried out using an alignment camera.

3. The manufacturing method for an optical waveguide according to claim 1,
    wherein the forming of the alignment mark at the predetermined position on the undercladding layer is carried out simultaneously with the patterning of the core on the front surface of the undercladding layer by photolithography including exposure by applying a radiation ray via a photomask and development; and
    wherein a forming material for the core and a forming material for the alignment mark are the same.

4. The manufacturing method for an optical waveguide according to claim 2,
    wherein the forming of the alignment mark at the predetermined position on the undercladding layer is carried out simultaneously with the patterning of the core on the front surface of the undercladding layer by photolithography including exposure by applying a radiation ray via a photomask and development; and
    wherein a forming material for the core and a forming material for the alignment mark are the same.

5. The manufacturing method for an optical waveguide according to claim 1,
    wherein before the cutting, the substrate is separated to manufacture the optical waveguide body; and wherein the cutting comprises cutting only the optical waveguide body.

6. The manufacturing method for an optical waveguide according to claim 2,
   wherein before the cutting, the substrate is separated to manufacture the optical waveguide body; and
   wherein the cutting comprises cutting only the optical waveguide body.

7. The manufacturing method for an optical waveguide according to claim 3,
   wherein before the cutting, the substrate is separated to manufacture the optical waveguide body; and
   wherein the cutting comprises cutting only the optical waveguide body.

8. The manufacturing method for an optical waveguide according to claim 4,
   wherein before the cutting, the substrate is separated to manufacture the optical waveguide body; and
   wherein the cutting comprises cutting only the optical waveguide body.

9. An optical waveguide body used for the manufacturing method for an optical waveguide according to claim 5, comprising:
   an undercladding layer;
   a core formed on the undercladding layer;
   an overcladding layer formed so as to cover the core; and
   an alignment mark formed on the undercladding layer so that a front surface thereof is exposed without being covered with the overcladding layer.

10. An optical waveguide body used for the manufacturing method for an optical waveguide according to claim 6, comprising:
    an undercladding layer;
    a core formed on the undercladding layer;
    an overcladding layer formed so as to cover the core; and
    an alignment mark formed on the undercladding layer so that a front surface thereof is exposed without being covered with the overcladding layer.

11. An optical waveguide body used for the manufacturing method for an optical waveguide according to claim 7, comprising:
    an undercladding layer;
    a core formed on the undercladding layer;
    an overcladding layer formed so as to cover the core; and
    an alignment mark formed on the undercladding layer so that a front surface thereof is exposed without being covered with the overcladding layer.

12. An optical waveguide body used for the manufacturing method for an optical waveguide according to claim 8, comprising:
    an undercladding layer;
    a core formed on the undercladding layer;
    an overcladding layer formed so as to cover the core; and
    an alignment mark formed on the undercladding layer so that a front surface thereof is exposed without being covered with the overcladding layer.

\* \* \* \* \*